(12) United States Patent
Kumamoto

(10) Patent No.: US 6,857,972 B2
(45) Date of Patent: Feb. 22, 2005

(54) GOLF CLUB SHAFT

(75) Inventor: Tomio Kumamoto, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/645,505

(22) Filed: Aug. 22, 2003

(65) Prior Publication Data
US 2004/0038744 A1 Feb. 26, 2004

(30) Foreign Application Priority Data
Aug. 22, 2002 (JP) ........................................ 2002-242286

(51) Int. Cl.⁷ ............................................. A63B 53/10

(52) U.S. Cl. ..................................................... 473/319

(58) Field of Search ................................. 473/316–323

(56) References Cited

U.S. PATENT DOCUMENTS 5,156,396 A 10/1992 Akatsuka et al.
6,273,830 B1 * 8/2001 Takemura et al. .......... 473/319

FOREIGN PATENT DOCUMENTS

JP 5-49717 A 3/1993

* cited by examiner

Primary Examiner—Stephen Blau
(74) Attorney, Agent, or Firm—Birch, Stewart, Kolasch & Birch, LLP

(57) ABSTRACT

A golf club shaft 1 has a prepreg (15) consisting of an intermediate-elasticity and high-strength carbon fiber reinforced resinous sheet having a tensile modulus of elasticity of 30 ton/mm² to 33 ton/mm² and a tensile strength of not less than 5000 MPa and a prepreg (16) consisting of a low-elasticity carbon fiber reinforced resinous sheet having a tensile modulus of elasticity of 5 ton/mm² to 10 ton/mm² and compressive breaking strain of not less than 2.0%. The prepregs (15) and the prepregs (16) are used to reinforce a tip side of the golf club shaft.

8 Claims, 4 Drawing Sheets

Fig. 4
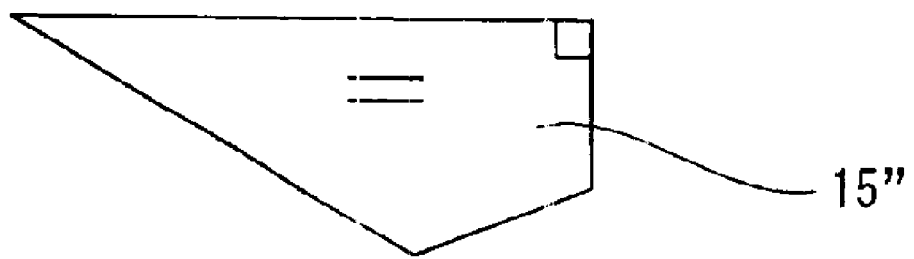
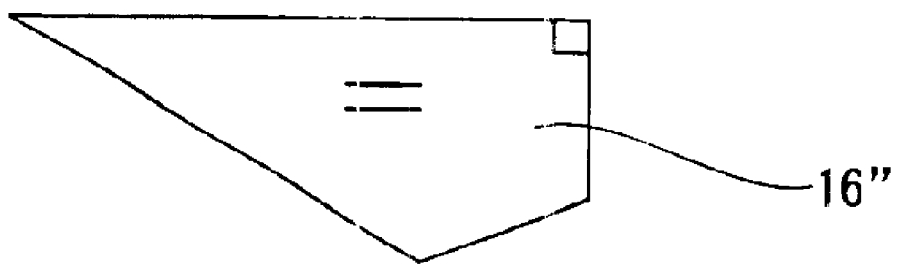

GOLF CLUB SHAFT

This nonprovisional application claims priority under 35 U.S.C. § 119(a) on Patent Application No. 2002-242256 filed in JAPAN on Aug. 22, 2002, which is herein incorporated by reference.

BACKGROUND OF THE INVENTION

1. Field to the Invention

The present invention relates to a golf club shaft and more particularly to a golf club shaft, made of a fiber reinforced resin, which is lightweight and has a high strength owing to improvement of a shock resistance at a tip side thereof.

2. Description of the Related Art

In recent years, the art for making a large head and a long shaft has been developed to hit a golf ball a long distance. However, it is difficult to swing the golf club having a large head mounted thereon. To facilitate swing of the golf club, it is necessary to make the golf club lightweight. To do so, there are growing demands for working out a design of reducing the weight of each part of the golf club.

As described above, it is necessary to work out the design of reducing the weight of each part of the golf club including the shaft. More specifically, in recent years, it has become possible to keep the rigidity of the shaft and make the shaft lightweight by composing the shaft of carbon fiber reinforced prepreg sheets whose resin content is not more than 25% or by composing the shaft of prepreg sheets having a high elasticity.

For example, in the golf club shaft disclosed in Japanese Patent Application Laid-Open No.5-49717, the straight layer (parallel with the axial direction of the shaft) has a two-layer construction consisting of the inner layer and the outer layer. The inner straight layer is made of carbon fibers having a high elasticity, whereas the outer straight layer is made of carbon fibers having a high strength. Thereby the shaft has a weight of not more than 63 g, supposing that the entire length of the shaft is 45 inches. That is, the proposed shaft is lightweight and has a proper degree of rigidity.

However, in the shaft disclosed in Japanese Patent Application Laid-Open No.5-49717, the strength of the high-elasticity carbon fibers is insufficient. Thereby the flexural strength of the shaft is affected by the high-elasticity carbon fibers of the inner layer having a low strength. In addition, the shaft has an insufficient strength in the compression direction. That is, the shaft having the above-described construction is incapable of having a sufficient strength. When a ball is hit, a great shock is applied to the neighborhood of the neck of the shaft where the head is mounted. The shaft does not have a sufficient strength against such a shock.

In the case where the carbon fiber reinforced prepreg sheet having a high elasticity is used for the shaft to keep the rigidity thereof, the breaking strength of the prepreg tends to fall. That is, as the tensile modulus of elasticity becomes higher from a peak of 290 GPa (about 30 ton/mm$^2$), the breaking strength of the prepreg tends to fall. Accordingly the shaft using the high-elasticity carbon fiber reinforced prepreg sheet has a low strength. Therefore it is important for a lightweight shaft to have a sufficient strength. That being the case, a material (tensile modulus of elasticity is about 290 GPa), containing a small amount of carbon fibers, which provides the shaft with a sufficient strength effectively has been used by preference. However, there is a limitation in making the shaft which is lightweight and yet has a desired strength and rigidity.

As described above, when a ball is hit, a great shock is applied to the neighborhood of the neck of the shaft at its tip side where the head is mounted. That is, the neck is the most breakable portion of the shaft. The lightweight shaft is easy to swing and has a high head speed. Thus the lightweight shaft has a problem that the neck thereof is broken owing to application of a considerably great shock thereto. Therefore there are demands for development of a lightweight shaft and improvement of the strength of the shaft at its tip side.

SUMMARY OF THE INVENTION

The present invention has been made in view of the above-described problems. Therefore it is an object of the present invention to provide a golf club shaft that is lightweight and yet durable owing to a high shock-resistant performance at the tip side thereof.

To achieve the object, a golf club shaft of the present invention includes an intermediate-elasticity and high-strength carbon fiber reinforced resinous sheet having a tensile modulus of elasticity of 30 ton/mm$^2$ to 33 ton/mm$^2$ and a tensile strength of not less than 5000 MPa; and a low-elasticity carbon fiber reinforced resinous sheet having a tensile modulus of elasticity of 5 ton/mm$^2$ to 10 ton/mm$^2$ and compressive breaking strain of not less than 2.0%. Each of the intermediate-elasticity and high-strength carbon fiber reinforced resinous sheet and the low-elasticity carbon fiber reinforced resinous sheet is used to reinforce a tip side of the golf club shaft.

As a result of energetic researches, the present inventors have found that by using the intermediate-elasticity and high-strength carbon fiber reinforced resinous sheet as the tip-side reinforcing layer, it is possible to maintain a proper degree of elasticity (hardness of the shaft) of the shaft and improve the tensile strength thereof. They have found that by also using the low-elasticity carbon fiber reinforced resinous sheet as the tip-side reinforcing layer, it is possible to make the breaking strain of the shaft high in a compression direction and improve the compression strength thereof and thereby improve the shock resistance thereof. That is, it is possible to make the strength of the shaft high, enhance the strength thereof in the tensile direction and the compression direction in a favorable balance, and improve the shock resistance thereof efficiently owing to the use of the intermediate-elasticity and high-strength carbon fiber having a high tensile strength in combination with the low-elasticity carbon fiber having a high compression strength and the use of a small amount of fiber reinforced resin. Thereby it is possible to make the shaft lightweight and highly durable.

To improve the strength of the shaft in the neighborhood of the neck at its tip side where the head is mounted, it is preferable to form the tip-side reinforcing carbon fiber as a straight layer parallel with the axial direction of the shaft.

The reason the tensile modulus of elasticity of the intermediate-elasticity and high-strength carbon fiber is set to the range of 30 ton/mm$^2$ to 33 ton/mm$^2$ is as follows: If the tensile modulus of elasticity thereof is less than 30 ton/mm$^2$, the rigidity of the intermediate-elasticity and high-strength carbon fiber is so soft that it is impossible to design the shaft having a desired hardness and in addition the shaft tends to have a low strength. On the other hand, if the tensile modulus of elasticity thereof is more than 33 ton/mm$^2$, the shaft has a low tensile strength and is hence liable to be broken. Therefore when the tensile modulus of elasticity of the intermediate-elasticity and high-strength carbon fiber is in the above range, the balance between the hardness of the shaft and its strength is the most favorable.

The reason the tensile strength of the intermediate-elasticity and high-strength carbon fiber is set to not less than 5000 MPa is as follows: If the tensile strength thereof is less than 5000 MPa, the intermediate-elasticity and high-strength carbon fiber has an insufficient strength. Prepreg UM33 series produced by TOHO TENAX Co., Ltd. can be preferably used as the intermediate-elasticity and high-strength carbon fiber reinforced resinous sheet. The higher the tensile strength is, the more favorable is. But the upper limit of the tensile strength is 6500 MPa.

The reason the tensile modulus of elasticity of the low-elasticity carbon fiber is set to 5 ton/mm$^2$ to 10 ton/mm$^2$ is as follows: If the tensile modulus of elasticity thereof is less than 5 ton/mm$^2$, the low-elasticity carbon fiber is very frail, has a low strength, and makes it difficult to perform manufacturing processes, which makes the manufacturing cost high. On the other hand, if the tensile modulus of elasticity thereof is more than 10 ton/mm$^2$, the low-elasticity carbon fiber has a high rigidity and a low compressive breaking strain. Consequently the shaft has a low strength. Generally, as the elastic modulus of the carbon fiber becomes higher, the compressive breaking strain thereof becomes increasingly low. That is, the carbon fiber having a low tensile modulus of elasticity has a high compressive breaking strain since the orientation of carbon atoms is incomplete. As the elastic modulus of the carbon becomes higher, the orientation of the carbon atoms becomes increasingly complete. Therefore the carbon fiber becomes frail and has a low compressive breaking strain.

The reason the compressive breaking strain of the low-elasticity carbon fiber is set to not less than 2.0% is to improve the shock resistance thereof in the compression direction. If the compressive breaking strain thereof is less than 2.0%, the low-elasticity carbon fiber has a low tensile strength and in addition the breaking strain is low against compression. Thus the shaft is readily broken. The higher the compressive breaking strain is, the more favorable it is. But the upper limit of the compressive breaking strain is about 3.5%. Pitch based carbon fiber is preferable as the low-elasticity carbon fiber.

It is preferable that the compressive breaking strain of the intermediate-elasticity and high-strength carbon fiber is in the range of 1.0% to 1.3%. It is preferable that the tensile strength of the low-elasticity carbon fiber is in the range of 1800 MPa to 2200 MPa.

It is favorable that each of the intermediate-elasticity and high-strength carbon fiber reinforced resinous sheet and the low-elasticity carbon fiber reinforced resinous sheet is disposed from said tip to a position located at not more than 20% of an overall length of said shaft. If the intermediate-elasticity and high-strength carbon fiber reinforced resinous sheet and the low-elasticity carbon fiber reinforced resinous sheet are used in combination in the range from the tip of the shaft to a position located at more than 20% of the overall length of the shaft, the shaft is heavy and is incapable of sufficiently absorbing an impact applied thereto. It is more favorable that the intermediate-elasticity and high-strength carbon fiber reinforced resinous sheet and the low-elasticity carbon fiber reinforced resinous sheet are disposed from the tip of the shaft to a position located at not more than 15% of the overall length of the shaft. In the case of a shaft for a wooden head, it is favorable that the intermediate-elasticity and high-strength carbon fiber reinforced resinous sheet and the low-elasticity carbon fiber reinforced resinous sheet are disposed in the length about 175 mm from the tip of the shaft. In the case of a shaft for an iron head, it is favorable that the intermediate-elasticity and high-strength carbon fiber reinforced resinous sheet and the low-elasticity carbon fiber reinforced resinous sheet are disposed in the length about 148 mm from the tip of the shaft.

It is preferable that each of the intermediate-elasticity and high-strength carbon fiber reinforced resinous sheet and the low-elasticity carbon fiber reinforced resinous sheet has a length not less than 8% nor more than 15% of the overall length of the shaft and is disposed from the tip thereof toward the butt thereof. By setting the length of each of the intermediate-elasticity and high-strength carbon fiber reinforced resinous sheet and the low-elasticity carbon fiber reinforced resinous sheet disposed from the tip toward the butt of the shaft to not less than 8% nor more than 15% of the overall length of the shaft, it is possible to efficiently improve the strength and shock resistance of the strength in the neighborhood of the tip and particularly in the neighborhood of the neck without increasing the weight of the shaft.

It is preferable that the ratio of a weight M1 of the intermediate-elasticity and high-strength carbon fiber to a weight M2 of the low-elasticity carbon fiber satisfies a relationship of:

$0.5 \leq$ the ratio of the weight M1 to the weight M2 $\leq 3.0$.

If the ratio is less than 0.5, at the tensile side, the number of the intermediate-elasticity and high-strength carbon fibers having a high strength is small and the number of the low-elasticity carbon fibers having a low tensile strength is big, when a three-point flexure breaking test is conducted. Thus the strength of the shaft at its tensile side is low. On the other hand, if the ratio is more than 3.0, at the compressive side, the number of the low-elasticity carbon fibers having a high compression strength is small. Thus the shaft is liable to be destroyed at its compressive side.

It is preferable that the low-elasticity carbon fiber reinforced resinous sheet is disposed outward from the intermediate-elasticity and high-strength carbon fiber reinforced resinous sheet. It is also preferable that the low-elasticity carbon fiber reinforced resinous sheet has the same configuration as that of the intermediate-elasticity and high-strength carbon fiber reinforced resinous sheet or is larger than the intermediate-elasticity and high-strength carbon fiber reinforced resinous sheet in such a way that the low-elasticity carbon fiber reinforced resinous sheet involves the intermediate-elasticity and high-strength carbon fiber reinforced resinous sheet.

When a three-point flexure breaking test is conducted, a phenomenon of compression and tension occurs in the shaft. The break of the shaft starts from the compressive side because the compression strength is lower than the tensile strength. When a bending test of the shaft is conducted, strain is applied to the outer layer thereof earlier than the inner layer thereof. Thus the break of the shaft starts from the outer layer thereof. Therefore it is preferable to dispose the low-elasticity carbon fiber reinforced resinous sheet having a high compression strength outward from the intermediate-elasticity and high-strength carbon fiber reinforced resinous sheet. It is also preferable to successively layer the low-elasticity carbon fiber reinforced resinous sheet and the intermediate-elasticity and high-strength carbon fiber reinforced resinous sheet.

The low-elasticity carbon fiber reinforced resinous sheet and the intermediate-elasticity and high-strength carbon fiber reinforced resinous sheet may not have the same configuration. But if the configuration of the low-elasticity carbon fiber reinforced resinous sheet is much different from that of the intermediate-elasticity and high-strength carbon fiber reinforced resinous sheet, a level difference is generated between both resinous sheets when they are wound. Thereby there is a possibility that a concavity is formed therebetween. Therefore it is preferable that the configuration of the low-elasticity carbon fiber reinforced resinous sheet is not much different from that of the intermediate-elasticity and high-strength carbon fiber reinforced resinous sheet but both configurations are similar. More specifically, they can be formed as a polygon such as a triangle, a quadrilateral or the like. It is possible to disperse a force applied to the shaft in the compression direction by making the low-elasticity carbon fiber reinforced resinous sheet having a high compression strength larger than the intermediate-elasticity and high-strength carbon fiber reinforced resinous sheet. It is preferable that each of the intermediate-elasticity and high-strength carbon fiber reinforced resinous sheet and the low-elasticity carbon fiber reinforced resinous sheet has a size large enough to be wound in two or more plies.

The low-elasticity carbon fiber reinforced resinous sheet and the intermediate-elasticity and high-strength carbon fiber reinforced resinous sheet may be bonded before they are wound, then they may be bounded. The outer layer may be wound after the inner layer is wound.

It is preferable that the weight of the shaft per unit length is in the range of 0.040 g/mm to 0.055 g/mm.

If the weight of the shaft per unit length is less than 0.040 g/mm, the shaft is so light that the shaft is liable to broken at portions other than the reinforced tip side thereof. On the other hand, if the weight thereof per unit length is more than 0.055 g/mm, the shaft is heavy and thus the golf club is difficult to swing. In this case, even though the shaft is not provided with the reinforcing layer, the shaft has a high strength. Therefore it is unnecessary to provide the shaft with the reinforcing layer. Accordingly the present invention is effective for a lightweight shaft having a weight in the above-described range.

It is favorable that the total weight of the low-elasticity carbon fiber reinforced resinous sheet and the intermediate-elasticity and high-strength carbon fiber reinforced resinous sheet is in the range of 8% to 20% of the total weight of the shaft.

If the total weight of both resinous sheets is less than 8%, the reinforcing layer consisting of both resinous sheets has a low strength and is thus ineffective as the reinforcing layer. On the other hand, if the total weight of the both resinous sheets is more than 20%, the weight of the shaft at its tip side is so heavy that the center of gravity of the shaft shifts to the tip side thereof. Consequently unless the weight of the head is reduced in correspondence to an increased amount of the total weight of both resinous sheets, it is difficult to design a club having a desired balance. The total weight of both resinous sheets is more favorably in the range of 10% to 18% and most favorably 12% to 15% of the total weight of the shaft.

It is preferable that the resin content of the intermediate-elasticity and high-strength carbon fiber reinforced resinous sheet is in the range of 24% to 33%. It is preferable that the resin content of the low-elasticity carbon fiber reinforced resinous sheet is in the range of 25% to 37%.

If the resin content of each resinous sheet is less than the lower limit, the connection strength in carbon fibers deteriorates and consequently the strength of the shaft deteriorates. On the other hand, if the resin content is more than the upper limit, the shaft becomes heavy. The resin has a roll of connecting the carbon fibers to each other. Thus if the resin content is small, the shaft has a low strength.

It is preferable that the shaft of the present invention has the shape of a pipe, having a hollow portion, composed of a laminate of fiber reinforced prepregs obtained by impregnating reinforcing fibers with resin. More specifically, the shaft can be constructed by appropriately combining a straight layer, an angular layer, and a hoop layer with one another. The straight layer means that the fibrous direction of the reinforcing fibers of the prepreg is parallel with the axial direction of the shaft. The angular layer means that the fibrous direction of the reinforcing fibers of the prepreg forms a certain angle to the axial direction of the shaft. The hoop layer means that the fibrous direction of the reinforcing fibers of the prepreg is perpendicular to the axial direction of the shaft. In dependence on demanded performance, it is possible to appropriately adjust the configuration, thickness, disposition of each prepreg, the number of the prepregs to be layered, and the number of turns of the prepregs. It is possible to appropriately alter the fibrous direction, tensile modulus of elasticity, and tensile strength of the reinforcing fibers of each prepreg other than the prepreg having the intermediate-elasticity and high-strength carbon fiber and the low-elasticity carbon fiber so long as alterations do not impair the effect of the present invention.

As resins that can be used for the fiber reinforced resin, thermosetting resin and thermoplastic resin can be used singly or in combination. In terms of strength and rigidity, the thermosetting resin is preferable. Epoxy resin is particularly preferable. In addition to the epoxy resin, unsaturated polyester resin (vinyl ester resin) can be used as the thermosetting resin. As the thermoplastic resin, polyamide resin and saturated polyester resin can be used.

The golf club shaft of the present invention is applicable to all kinds of golf clubs. For example, a wooden head, an iron head, or putter head can be mounted on the golf club shaft of the present invention.

BRIEF DESCRIPTION OF THE DRAWINGS

FIG. 4 is a schematic sectional view showing still another mode of the tip-side reinforcing prepregs different in configurations or size.

DETAILED DESCRIPTION OF THE PREFERRED EMBODIMENTS

The embodiments of the present invention will be described below with reference to drawings.

Figure 1:
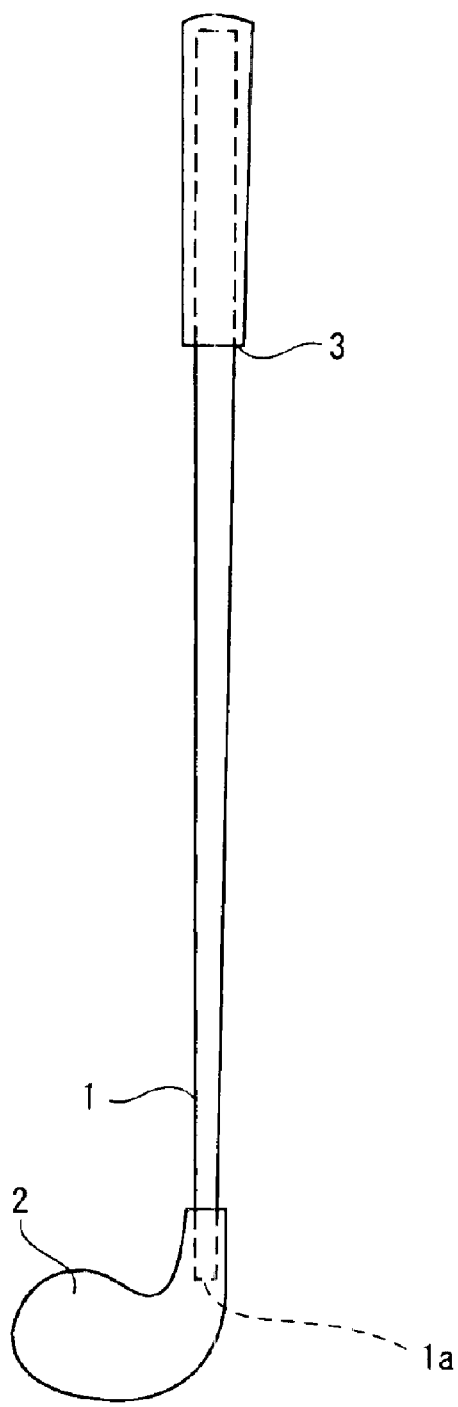
FIG. 1 is a schematic view showing a golf club using a golf club shaft according to a first embodiment of the present invention.
Figure 2:
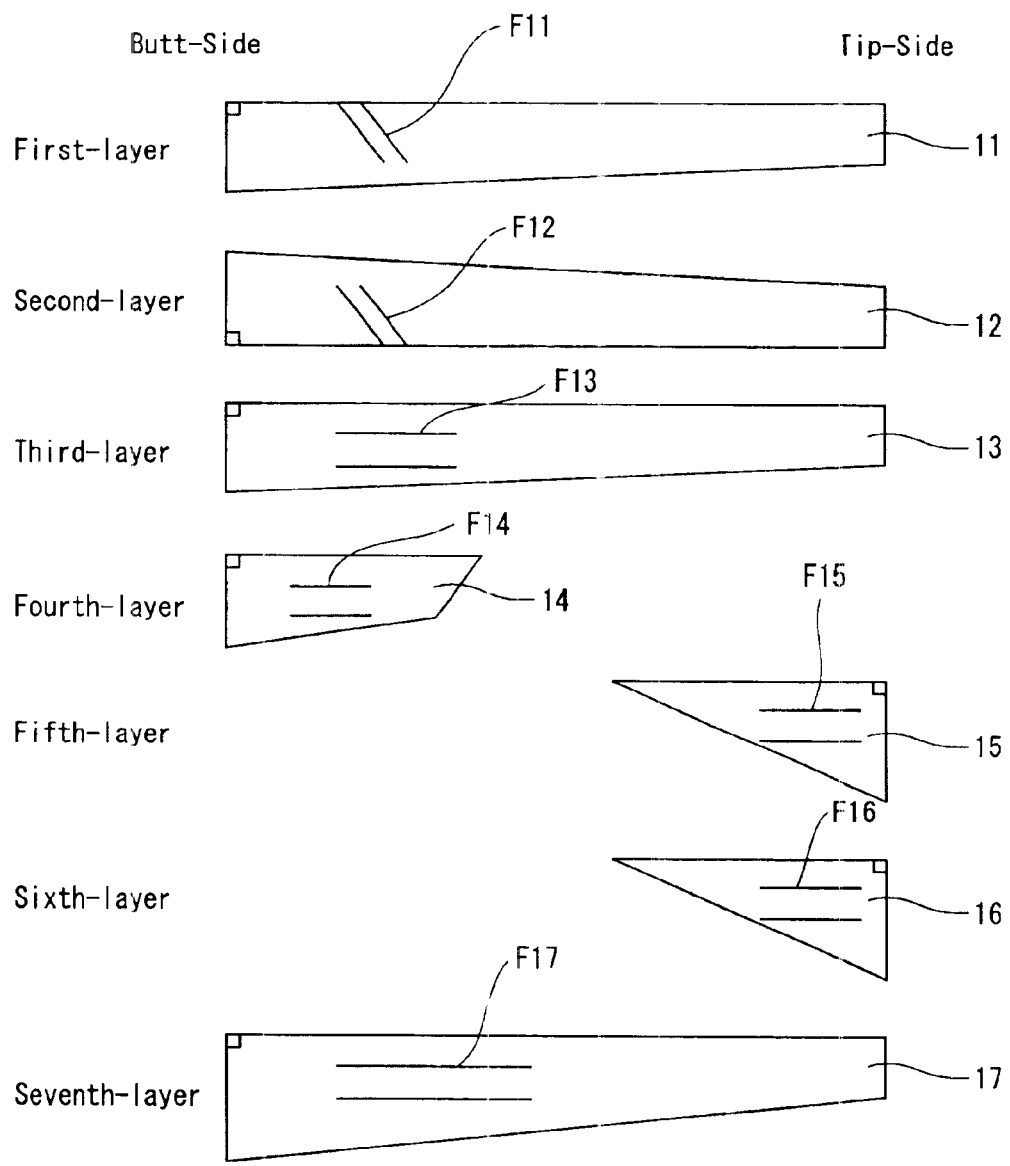
FIG. 2 shows a layering construction of prepregs for use in the golf club shaft of the first embodiment.

FIGS. 1 and 2 show a golf club shaft (hereinafter referred to as merely shaft) according to a first embodiment of the present invention. A shaft 1 has the shape of a pipe, having a hollow portion, composed of a laminate of prepregs layered one upon another. A head 2 is installed on the shaft 1 at one end thereof having a smaller diameter. A grip 3 is installed on the shaft 1 at the other end thereof having a larger diameter. The shaft 1 tapers off from a grip-mounting side thereof to a head-mounting side thereof.

The whole length of the shaft 1 is 1168 mm. The weight of the shaft 1 is 48 g. Thus the weight of the shaft 1 is 0.041 g per millimeter. The outer diameter of the shaft 1 at its tip 1a is set to 9.0 mm. The thickness of the shaft 1 at its tip 1a is set to 2.75 mm.

The shaft 1 is formed by a sheet winding method as follows: After prepregs 11 through 17 shown in FIG. 2 are layered one upon another by sequentially winding them on a core (not shown) from the inner peripheral side (in the order from prepreg 11, 12 . . . 17), a tape made of polyethylene (PE), polyethylene terephthalate (PET) or the like is lapped on the laminate. Then integral molding is performed. That is, the tape-lapped laminate is heated in an oven under a pressure to harden the resin. Thereafter the core is drawn from the laminate. Carbon fiber is used as the reinforcing fibers F11 to F17 of the prepregs 11 through 17. Epoxy resin is used as the matrix resin of the prepregs 11 through 17.

The construction of the laminate of the prepregs 11 (first layer) through 17 (seventh layer) is described below.

In the prepregs 11 and 12, the fibrous angle of the reinforcing fiber F11 and that of the reinforcing fiber F12 with respect to the axis of the shaft 1 are −45° and +45° (angular layer) respectively. The tensile modulus of elasticity of each of the reinforcing fibers F11 and F12 is set to 40 ton/mm². Each of the prepregs 12 and 13 has a length of 1168 nm equal to the overall length of the shaft 1 and wound in two plies respectively.

In the prepreg 13, the fibrous angle of the reinforcing fiber F13 with respect to the axis of the shaft 1 is 0° (straight layer). The tensile modulus of elasticity of the reinforcing fiber F13 is set to 30 ton/mm². The prepreg 13 has a length of 1168 mm equal to the overall length of the shaft 1 and wound in one ply.

In the prepreg 14, the fibrous angle of the reinforcing fiber F14 with respect to the axis of the shaft 1 is 0° (straight layer). The tensile modulus of elasticity of the reinforcing fiber F14 is set to 30 ton/mm². The length of the longer side of the prepreg 14 and the shorter side thereof in the axial direction of the shaft 1 are set to 300 mm and 200 mm respectively. The prepreg 14 is wound in one ply. The prepreg 14 is disposed at the butt side (grip side) as a butt-side reinforcing layer.

In the prepreg 15, the fibrous angle of the reinforcing fiber F15 with respect to the axis of the shaft 1 is 0° (straight layer). The tensile modulus of elasticity of the reinforcing fiber F15 and the tensile strength thereof are set to 33 ton/mm² and 5200 MPa respectively. The length of the prepreg 15 in the axial direction of the shaft 1 is 300 mm. The prepreg 15 is wound in four plies. The prepreg 15 is disposed at the tip side (head side) as a tip-side reinforcing layer.

In the prepreg 16, the fibrous angle of the reinforcing fiber F16 with respect to the axis of the shaft 1 is 0° (straight layer). The tensile modulus of elasticity of the reinforcing fiber F16 and the tensile breaking strain thereof are set to 10 ton/mm² and 2.0% respectively. The length of the prepreg 16 in the axial direction of the shaft 1 is 300 mm. The prepreg 16 is wound in four plies. The prepreg 15 is disposed at the tip side (head side) as a tip-side reinforcing layer.

In the prepreg 17, the fibrous angle of the reinforcing fiber F17 with respect to the axis of the shaft 1 is 0° (straight layer). The tensile modulus of elasticity of the reinforcing fiber F17 is set to 24 ton/mm². The prepreg 17 has a length of 1168 mm equal to the overall length of the shaft 1 and is wound in one ply.

The shaft 1 has the prepreg 15 consisting of an intermediate-elasticity and high-strength carbon fiber reinforced resinous sheet, having a tensile modulus of elasticity of 30 ton/mm² to 33 ton/mm² and a tensile strength of not less than 5000 MPa, disposed from the tip thereof toward the butt thereof as a reinforcing layer; and the prepreg 16 consisting of a low-elasticity carbon fiber reinforced resinous sheet, having a tensile modulus of elasticity of 5 ton/mm² to 10 ton/mm² and compressive breaking strain of not less than 2.0%, disposed from the tip thereof toward the butt thereof as a reinforcing layer. The length of each of the prepregs 15 and 16 is 10% of the overall length of the shaft 1. The prepregs 15 and 16 are disposed from the tip of the shaft 1 toward the butt thereof.

The ratio of the weight M1 of the intermediate-elasticity and high-strength carbon fiber contained in the prepreg 15 to the weight M2 of the low-elasticity carbon fiber contained in the prepreg 16 is 1/1, namely, 1. The total weight of the prepregs 15 and 16 is set to 10% of the total weight of all the prepregs 11 through 17. The prepregs 15 and 16 have the same configuration.

The shaft 1 has the prepreg 15 consisting of the intermediate-elasticity and high-strength carbon fiber reinforced resinous sheet, having a tensile modulus of elasticity of 33 ton/mm² and a tensile strength of 5200 MPa, used as the tip-side reinforcing layer; and the prepreg 16 consisting of the low-elasticity carbon fiber reinforced resinous sheet, having a tensile modulus of elasticity of 10 ton/mm² and compressive breaking strain of 2.0%, used as the tip-side reinforcing layer. By utilizing the advantage of the prepregs 15 and 16, it is possible to make the shaft lightweight and enhance the shock resistance thereof at its tip side.

Figure 3:
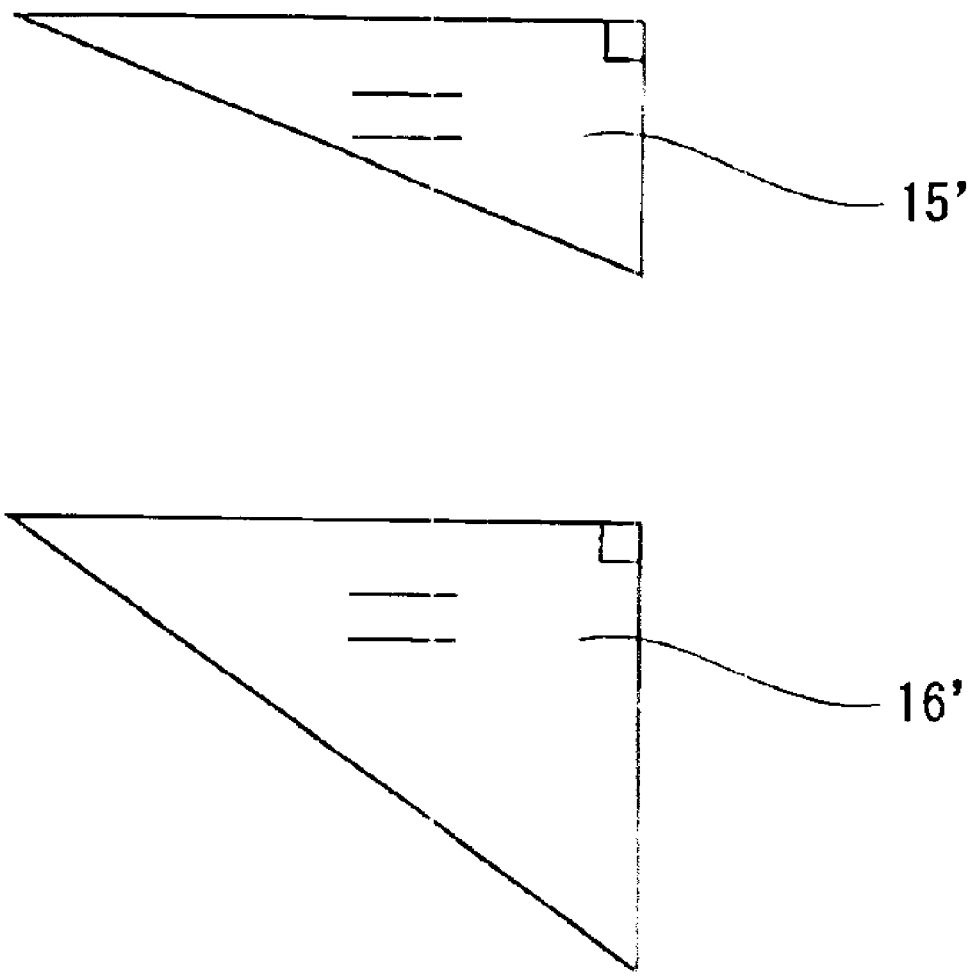
FIG. 3 is a schematic sectional view showing another mode of tip-side reinforcing prepregs different in size.

In the first embodiment, the prepregs 15 and 16 are triangular and the same configuration. But as shown in FIG. 3, a prepreg 16' having the low-elasticity carbon fiber involves a prepreg 15' having the intermediate-elasticity and high-strength carbon fiber and is larger than the prepreg 15'. As shown in FIG. 4, a prepreg 15" and a prepreg 16" may be quadrilateral and the same configuration and may be different in the size thereof. In addition, the prepregs 15 and 16 may have other configurations and different sizes. In the first embodiment, the prepreg having the low-elasticity carbon fiber is disposed outward from the prepreg having the intermediate-elasticity and high-strength carbon fiber. However, the prepreg having the low-elasticity carbon fiber may be disposed inward from the prepreg having the intermediate-elasticity and high-strength carbon fiber.

As the fiber of the fiber reinforced resin having a tensile modulus of elasticity of 30 ton/mm², it is possible to use MR series (MR40) produced by Mitsubishi Rayon Co., Ltd. and T800H, M30 produced by Toray Industries Inc. As the fiber of the fiber reinforced resin having a tensile modulus of elasticity of 40 ton/mm², HRX series (HR40) produced by Mitsubishi Rayon Co., Ltd. and M40J produced by Toray Industries Inc. can be used. As the fiber of the fiber reinforced resin having a tensile modulus of elasticity of 33 ton/mm², UM33 produced by TOHO TENAX Co., Ltd. can be used. As the fiber of the fiber reinforced resin having a tensile modulus of elasticity of 10 ton/mm², E1026A-12N produced by Nippon Graphite Fiber Company can be used. In addition, it is possible to use TR350C-125S, MR350C-100S, and TR350C-100C produced by Mitsubishi Rayon Co., Ltd.

The examples of the golf club shaft of the present invention and comparison examples will be described below in detail.

The property (elastic modulus (unit: "ton/mm²") of carbon fiber is abbreviated as merely "t", tensile strength, and compressive breaking strain) of the prepreg disposed in fifth and sixth layers forming the tip-side reinforcing layer and the disposition range of the fifth and sixth layers were set, as shown in table 1. The prepregs disposed at layers other than the fifth and sixth layers had the same construction. The shafts of the examples and the comparison examples had a length of 1168 mm (46 inches) equally.

TABLE 1

|  | E1 | E2 | E3 | E4 | E5 | E6 |
|---|---|---|---|---|---|---|
| Elastic modulus and tensile strength of fifth-layer prepreg | 33 t 5200 Mpa | 33 t 5200 Mpa | 33 t 5200 Mpa | 33 t 5200 Mpa | 33 t 5200 Mpa | 33 t 5200 Mpa |
| Elastic modulus and compressive breaking strain of sixth-layer prepreg | 10 t 2.0% | 5 t 2.4% | 10 t 2.0% | 10 t 2.0% | 10 t 2.0% | 10 t 2.0% |
| Disposing range of fifth-layer and sixth-layer prepregs | 15% | 15% | 10% | 8.0% | 20% | 7.0% |
| Result of durability test | Neck was broken at 3000th hitting | Neck was broken at 3578th hitting | Neck was broken at 4587th hitting | Neck was broken at 3670th hitting | Central portion was broken at 5043rd hitting | Neck was broken at 1800th hitting |

|  | CE1 | CE2 | CE3 | CE4 | CE5 |
|---|---|---|---|---|---|
| Elastic modulus and tensile strength of fifth-layer prepreg | 24 t 4500 Mpa | 33 t 5200 Mpa | 40 t 4500 Mpa | 33 t 5200 Mpa | 10 t |
| Elastic modulus and compressive breaking strain of sixth-layer prepreg | 24 t 1.4% | 40 t 1.0% | 10 t 2.0% | 33 t 1.2% | 10 t 2.0% |
| Disposing range of fifth-layer and sixth-layer prepregs | 20% | 15% | 15% | 7.0% |  |
| Result of durability test | Neck was broken at 1553rd hitting | Neck was broken at 1024th hitting | Neck was broken at 1289th hitting | Neck was broken at 1000th hitting | Neck was broken at 1250th hitting | where E denotes example.
where CE denotes comparison example.

EXAMPLE 1

The shaft of the example 1 had a construction similar to that of the shaft of the first embodiment. That is, the prepreg of each of the fifth and sixth layers was disposed from the tip of the shaft to a position located at 15% of the overall length of the shaft. The carbon fiber of the prepreg of the fifth layer had a tensile modulus of elasticity of 33 ton/mm$^2$ and a tensile strength of 5200 MPa. The carbon fiber of the prepreg of the sixth layer had a tensile modulus of elasticity of 10 ton/mm$^2$ and a compressive breaking strain of 2.0%. The ratio of M1/M2 was one.

As the prepreg of the first, second, and third layers, 3255G-10 produced by Toray Industries Inc. was used. As the prepreg of the fourth layer, 8255S-100 produced by Toray Industries Inc. was used. As the prepreg of the fifth layer, UM33-100 produced by TOHO TENAX Co., Ltd. was used. As the prepreg of the sixth layer, E1026A-10N produced by Nippon Graphite Fiber Company was used. As the prepreg of the seventh layer, 3255G-10 produced by Toray Industries Inc. was used.

EXAMPLE 2

The shaft of the example 2 had the same specification as that of the example 1 except that E052AA-10N produced by Nippon Graphite Fiber Company was used as the prepreg of the sixth layer, that the carbon fiber had a tensile modulus of elasticity of 5 ton/mm$^2$ and a compressive breaking strain of 2.4%, and that the ratio of M1/M2 was 1.5.

EXAMPLE 3

The shaft of the example 3 had the same specification as that of the example 1 except that the tip-side reinforcing layer was disposed from the tip thereof to a position located at 10% of the overall length of the shaft.

EXAMPLE 4

The shaft of the example 4 had the same specification as that of the example 1 except that the tip-side reinforcing layer was disposed from the tip thereof to a position located at 8% of the overall length of the shaft.

EXAMPLE 5

The shaft of the example 5 had the same specification as that of the example 1 except that the tip-side reinforcing layer was disposed from the tip thereof to a position located at 20% of the overall length of the shaft.

EXAMPLE 6

The shaft of the example 6 had the same specification as that of the example 1 except that the tip-side reinforcing layer was disposed from the tip thereof to a position located at 7% of the overall length of the shaft. The fifth layer had a compressive breaking strain of about 1.2%. The sixth layer had a tensile strength of 1800 MPa to 2200 MPa.

COMPARISON EXAMPLE 1

As the fifth-layer prepreg of the comparison example 1, 3255G-10 produced by Toray Industries Inc. was used. The carbon fiber had a tensile modulus of elasticity of 24 ton/mm$^2$ and a tensile strength of 4500 MPa.

As the sixth-layer prepreg, 3255G-10 produced by Toray Industries Inc. was used. The carbon fiber had a tensile modulus of elasticity of 24 ton/mm$^2$ and a compressive breaking strain of 1.4%.

The shaft of the comparison example 1 had the same specification as that of the example 1 except that the prepreg of the fifth layer and that of the sixth layer were disposed from the tip thereof to a position located at 20% of the overall length thereof.

COMPARISON EXAMPLE 2

The shaft of the comparison example 2 had the same specification as that of the example 1 except that HRX3500-

100S produced by Mitsubishi Rayon Co., Ltd. was disposed as the sixth-layer prepreg. The carbon fiber had a tensile modulus of elasticity of 40 ton/mm$^2$ and a compressive breaking strain of 1.0%.

COMPARISON EXAMPLE 3

The shaft of the comparison example 3 had the same specification as that of the example 1 except that HRX3500-100S produced by Mitsubishi Rayon Co., Ltd. was used as the fifth-layer prepreg. The carbon fiber had a tensile modulus of elasticity of 40 ton/mm$^2$ and a tensile strength of 4500 MPa.

COMPARISON EXAMPLE 4

The shaft of the comparison example 4 had the same specification as that of the example 1 except that VM33-100 produced by TOHO TENAX Co., Ltd. was used as the sixth-layer prepreg, that the carbon fiber had a tensile modulus of elasticity of 33 ton/mm$^2$ and a compressive breaking strain of 1.2%, and that the sixth-layer prepreg was disposed from the tip of the shaft to a position located at 7% of the overall length of the shaft.

COMPARISON EXAMPLE 5

The shaft of the comparison example 5 had the same specification as that of the example 1 except that 1026A-10N produced by Nippon Graphite Fiber Company. was used as the fifth-layer prepreg, that the carbon fiber had a tensile modulus of elasticity of 10 ton/mm$^2$ and a tensile strength of 2000 Mpa, and that the fifth-layer prepreg was disposed from the tip of the shaft to a position located at 8% of the overall length of the shaft.

A durability test of the shaft of each of the examples and the comparison examples was conducted by a method described later. Table 1 shows test results.

Durability Test

A swing test was conducted to evaluate the durability of the shaft of each of the examples and the comparison examples. Using a shot robot III manufactured by Miyamae Co., Ltd., golf balls were hit at a head speed of 50 m/s with golf clubs. The hitting point was spaced at an interval of 10 mm upward from a point spaced 30 mm from the club face center toward the heel.

As shown in table 1, in the examples 1 through 6, an intermediate-elasticity and high-strength carbon fiber reinforced resinous sheet, having a tensile modulus of elasticity of 30 ton/mm$^2$ to 33 ton/mm$^2$ and a tensile strength of not less than 5000 MPa, disposed from the tip thereof toward the butt thereof as a reinforcing layer; and a low-elasticity carbon fiber reinforced resinous sheet, having a tensile modulus of elasticity of 5 ton/mm$^2$ to 10 ton/mm$^2$ and compressive breaking strain of not less than 2.0%, disposed from the tip thereof toward the butt thereof as a reinforcing layer. On the other hand, in the comparison examples 1 through 5, the property of the carbon fiber reinforced resinous sheets used to reinforce the tip side of the shaft was out of the specified scope of the present invention.

In the durability test, the shot robot hit golf balls 1800 times to 5043 times with each shaft of the example 1 through 6 before the neck thereof was broken, whereas the shot robot hit golf balls 1000 times to 1553 times with each shaft of the comparison examples 1 through 5 before the neck thereof was broken. Thus it was confirmed that the shafts of the example 1 through 6 was superior to those of the comparison examples 1 through 5 in the durability and strength thereof.

In the shaft of the example 5, the tip-side reinforcing layer was disposed from the tip thereof to a position located at 20% of the overall length thereof. That is, the reinforcing layer was comparatively long. Therefore the shaft was broken not at the neck but in the vicinity of the center thereof in its longitudinal direction.

As apparent from the foregoing description, according to the present invention, by using the intermediate-elasticity and high-strength carbon fiber reinforced resinous sheet as the tip-side reinforcing layer, it is possible to maintain a proper degree of elasticity (hardness of shaft) of the shaft and improve the tensile strength thereof. By using the low-elasticity carbon fiber reinforced resinous sheet as the tip-side reinforcing layer, it is possible to make the breaking strain of the shaft high in the compression direction and improve the compression strength thereof and thereby improve the shock resistance thereof.

The combination of these two kinds of carbon fibers make the strength of the shaft high by a small amount of fiber reinforced resin, enhance the strength thereof in both the tensile direction and the compression direction in a favorable balance, and improve the shock resistance thereof efficiently. Thereby it is possible to make the shaft lightweight and highly durable. Thus the shaft has a proper degree of rigidity and is lightweight. Therefore a golf club composed of the shaft is capable of hitting a golf ball a long distance. Further the shaft has a sufficient strength at its tip side required to have a high shock resistance and is durable.

What is claimed is:

1. A golf club shaft comprising:
    an intermediate-elasticity and high-strength carbon fiber reinforced resinous sheet having a tensile modulus of elasticity of 30 ton/mm$^2$ to 33 ton/mm$^2$ and a tensile strength of not less than 5000 MPa; and
    a low-elasticity carbon fiber reinforced resinous sheet having a tensile modulus of elasticity of 5 ton/mm$^2$ to 10 ton/mm$^2$ and compressive breaking strain of not less than 2.0%,
    each of said intermediate-elasticity and high-strength carbon fiber reinforced resinous sheet and said low-elasticity carbon fiber reinforced resinous sheet being used to reinforce a tip side of said golf club shaft, wherein each of said intermediate-elasticity and high-strength carbon fiber reinforced resinous sheet and said low-elasticity carbon fiber reinforced resinous sheet is disposed from said tip to a position located at not more than 20% of an overall length of said golf club shaft.

2. The golf club shaft according to claim 1, wherein each of said intermediate-elasticity and high-strength carbon fiber reinforced resinous sheet and said low-elasticity carbon fiber reinforced resinous sheet has a length not less than 8% nor more than 15% of an overall length of said golf club shaft and is disposed from said tip of said golf club shaft toward a butt thereof.

3. The golf club shaft according to claim 2, wherein a weight M1 of said intermediate-elasticity and high-strength carbon fiber and a weight M2 of said low-elasticity carbon fiber satisfy a relationship of:
    $0.5 \leq$ a ratio of said weight M1 to said weight M2 $\leq 3.0$.

4. The golf club shaft according to claim 3, wherein said low-elasticity carbon fiber reinforced resinous sheet is disposed outward from said intermediate-elasticity and high-strength carbon fiber reinforced resinous sheet; and
    said low-elasticity carbon fiber reinforced resinous sheet has the same configuration as that of said intermediate-elasticity and high-strength carbon fiber reinforced resinous sheet or is larger than said intermediate-elasticity and high-strength carbon fiber reinforced resinous sheet.

5. The golf club shaft according to claim 2, wherein said low-elasticity carbon fiber reinforced resinous sheet is disposed outward from said intermediate-elasticity and high-strength carbon fiber reinforced resinous sheet; and said low-elasticity carbon fiber reinforced resinous sheet has the same configuration as that of said intermediate-elasticity and high-strength carbon fiber reinforced resinous sheet or is larger than said intermediate-elasticity and high-strength carbon fiber reinforced resinous sheet.

6. The golf club shaft according to claim 1, wherein a weight M1 of said intermediate-elasticity and high-strength carbon fiber and a weight M2 of said low-elasticity carbon fiber satisfy a relationship of:

$0.5 \leq$ a ratio of said weight M1 to said weight $M2 \leq 3.0$.

7. The golf club shaft according to claim 6, wherein said low-elasticity carbon fiber reinforced resinous sheet is disposed outward from said intermediate-elasticity and high-strength carbon fiber reinforced resinous sheet; and said low-elasticity carbon fiber reinforced resinous sheet has the same configuration as that of said intermediate-elasticity and high-strength carbon fiber reinforced resinous sheet or is larger than said intermediate-elasticity and high-strength carbon fiber reinforced resinous sheet.

8. The golf club shaft according to claim 1, wherein said low-elasticity carbon fiber reinforced resinous sheet is disposed outward from said intermediate-elasticity and high-strength carbon fiber reinforced resinous sheet; and said low-elasticity carbon fiber reinforced resinous sheet has the same configuration as that of said intermediate-elasticity and high-strength carbon fiber reinforced resinous sheet or is larger than said intermediate-elasticity and high-strength carbon fiber reinforced resinous sheet.

* * * * *